(No Model.)
C. F. SANFORD.
GAS GENERATOR AND BURNER.
No. 521,822. Patented June 26, 1894.
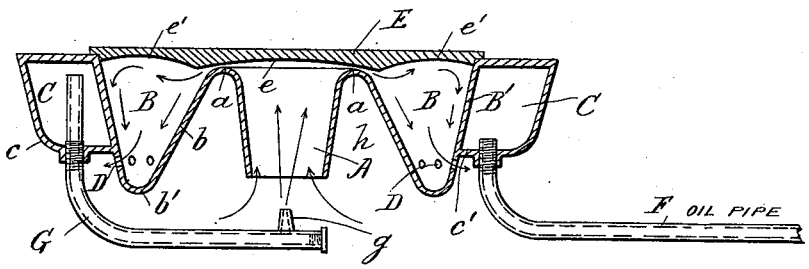
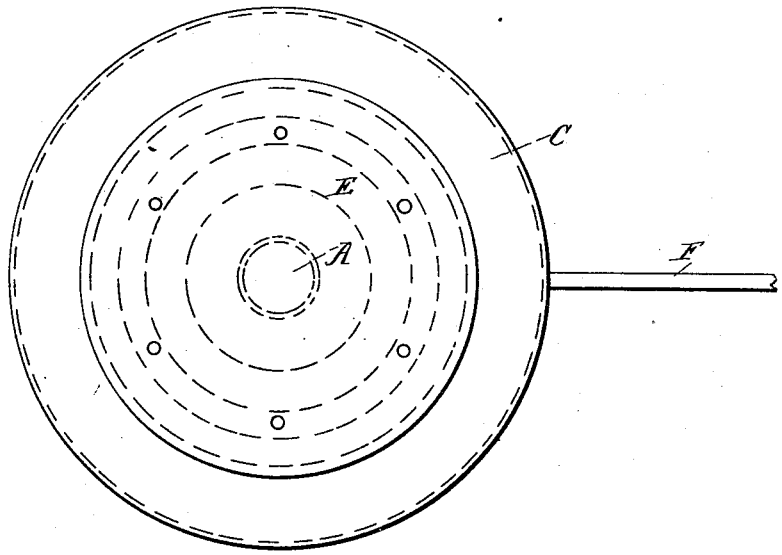
WITNESSES
INVENTOR
Clifford F. Sanford
by Herbert W. T. Jenner.
Attorney

UNITED STATES PATENT OFFICE.

CLIFFORD F. SANFORD, OF FINDLAY, OHIO.

GAS GENERATOR AND BURNER.

SPECIFICATION forming part of Letters Patent No. 521,822, dated June 26, 1894.

Application filed January 11, 1894. Serial No. 496,502. (No model.)

*To all whom it may concern:*

Be it known that I, CLIFFORD F. SANFORD, a citizen of the United States, residing at Findlay, in the county of Hancock and State of Ohio, have invented certain new and useful Improvements in Gas Generators and Burners; and I do hereby declare the following to be a full, clear, and exact description of the invention, such as will enable others skilled in the art to which it appertains to make and use the same.

This invention relates to gas generators and burners adapted for use in connection with hydrocarbon and other similar oils; and it consists in the novel construction and combination of the parts hereinafter fully described and claimed.

In the drawings: Figure 1 is a vertical section through the burner; and Fig. 2 is a plan view of the burner.

A is the mixing tube arranged at the center of the burner, and formed conical, with its larger end at the top.

B is an annular chamber which joins onto the curved lip $a$ at the top of the tube A. The inner side $b$ of the chamber B is flared downwardly and outwardly, and is provided with an annular bottom portion $b'$. The outer side B' of the chamber B joins onto the portion $b'$ and extends upwardly to a point a little above the level of the lip $a$. The side B' is conical and is largest at the top. This construction of the chamber B causes its annular cross-section to be conical, with the apex of the cone at its bottom $b'$. This chamber is therefore separated from the tube A by a neutral air space $h$, and very little heat is conducted to the said tube A.

C is the annular generating chamber which joins onto the upper part of the side B' of the chamber B, and is provided with a curved edge $c$ around its bottom $c'$. A series of holes D is formed in the side B' under the bottom $c'$ of the generating chamber. The top of the chamber B is open and is provided with a cover E. This cover is provided with a concave surface $e$ extending over the lip $a$, and has an annular concave surface $e'$ surrounding the said surface $e$ and arranged so as to form the top of the annular chamber B.

F is the inlet pipe for the oil or hydrocarbon, which communicates with the generating chamber C.

G is the gas pipe which communicates with the upper part of the generating chamber and extends under the mixing tube. A nozzle $g$ projects upwardly from the pipe G at the center of the mixing tube.

The device is preferably circular in form, but it may be made oval if desired. The arrows in the drawings indicate the directions of the currents of gas and air. The oil from the pipe F passes under pressure into the generating chamber and flows around its annular bottom. The bottom of the generating chamber being in close proximity to the burning gas, issuing from the holes D, becomes very hot, and converts the oil into gas which is forced through the pipe G and nozzle $g$ up the center of the tube A. The air is drawn into the tube by the stream or gas and mixes with the gas. The mixture of gas and air burns inside the chamber B and under and around the generating chamber.

The device is heated in the first place by igniting a little oil poured into the bottom of the chamber B.

The device may be made of various sizes, and several similar devices may be coupled to one oil supply pipe when a large amount of heat is required.

What I claim is—

1. A gas generator and burner, consisting of a central mixing tube, the annular chamber B conical in cross-section and joining onto the top of the mixing tube and provided with holes around its lower edge, an annular generating chamber surrounding the chamber B and arranged above the said holes, a cover provided with a concave surface arranged over the top of the mixing tube, and a gas pipe connected to the generating chamber and provided with a projecting nozzle arranged under the mixing tube, substantially as set forth.

2. A gas generator and burner, consisting of a central mixing tube having a curved lip $a$, the annular chamber B conical in cross-section and provided with the downwardly and outwardly flaring side $b$ joining onto the said lip, and the holes around the lower edge of its outer side; an annular generating chamber surrounding the chamber B above the said holes and having the curved bottom edge c, the cover provided with the concave surface e extending over the lip a; and a gas pipe connected with the generating chamber and provided with a projecting nozzle arranged under the mixing tube, substantially as set forth.

In testimony whereof I affix my signature in presence of two witnesses.

CLIFFORD F. SANFORD.

Witnesses:
W. W. SHULER,
FRANK. W. BRUBAKER.